(12) United States Patent
Kita (10) Patent No.: US 8,851,313 B2
(45) Date of Patent: Oct. 7, 2014

(54) ELECTRICAL JUNCTION BOX (75) Inventor: Yukinori Kita, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 436 days.

(21) Appl. No.: 13/212,705

(22) Filed: Aug. 18, 2011

(65) Prior Publication Data
US 2012/0125922 A1    May 24, 2012

(30) Foreign Application Priority Data
Nov. 24, 2010   (JP) .................................. 2010-261673

(51) Int. Cl.
*H02G 3/08*   (2006.01)
*H01R 13/639*   (2006.01)
*B60R 16/023*   (2006.01)

(52) U.S. Cl.
CPC .......... *H01R 13/639* (2013.01); *H01R 2201/26* (2013.01); *H02G 3/08* (2013.01); *B60R 16/0238* (2013.01); *B60R 16/0239* (2013.01)
USPC ........ 220/3.8; 220/4.02; 174/17 R; 174/50.51

(58) Field of Classification Search
CPC ........... B60R 16/0238; B60R 16/0239; H01R 13/639; H01R 2201/26; H02G 3/08
USPC ....... 439/372, 299, 924.2, 144; 174/17 R, 50, 174/50.51; 220/3.2, 3.3, 3.5, 3.6, 3.9, 3.8, 220/4.02
See application file for complete search history.

(56) References Cited

U.S. PATENT DOCUMENTS

| | | | | |
|---|---|---|---|---|
| 2,216,883 A * | 10/1940 | Klarfeld | | 174/659 |
| 4,771,910 A * | 9/1988 | Roy | | 220/4.02 |
| 4,864,078 A * | 9/1989 | Bowman | | 174/486 |
| 4,967,924 A * | 11/1990 | Murofushi et al. | | 220/3.8 |
| 4,979,634 A * | 12/1990 | Begley | | 220/242 |
| 6,007,353 A * | 12/1999 | Webster | | 439/142 |
| 6,420,654 B1 * | 7/2002 | Shotey et al. | | 174/66 |
| 6,642,446 B2 * | 11/2003 | Dodds et al. | | 174/50 |
| 6,814,606 B2 | 11/2004 | Kobayashi | | |
| 7,419,391 B2 * | 9/2008 | Schmidt | | 439/157 |

FOREIGN PATENT DOCUMENTS

| | | |
|---|---|---|
| JP | A-2000-323232 | 11/2000 |
| JP | A-2002-075535 | 3/2002 |
| JP | A-2004-158374 | 6/2004 |

* cited by examiner

*Primary Examiner* — Robert J Hicks
*Assistant Examiner* — Kareen Rush
(74) *Attorney, Agent, or Firm* — Oliff PLC (57) ABSTRACT

An electrical junction box configured to stably hold a cover member in a standby state in a first position apart from a connector-mounting section. The electrical junction box includes a cover member rotatably attached to a casing about rotary support axes, an engaging projection provided on the casing that engages the cover member to position the cover member in the first position, a guide projection provided on one of the casing and the cover member, and a pair of positioning walls provided on the other of the casing and the cover member, wherein the cover member is positioned with respect to the engaging projection in an axial direction of the rotary support axes when the pair of positioning wall portions pinch the guide projection.

11 Claims, 4 Drawing Sheets

ELECTRICAL JUNCTION BOX

CROSS-REFERENCE TO RELATED APPLICATION

This application claims priority to JP 2010-261673 filed in Japan on Nov. 24, 2010, the entire disclosure of which is hereby incorporated by reference herein in its entirety.

BACKGROUND

Exemplary embodiments of this disclosure relate to an electrical junction box to be installed, for example, in a motor vehicle or the like, and more particularly, relates to an electrical junction box including a cover member that can prevent a connector disposed on a connector-mounting section from coming out of the section.

Heretofore, an electrical junction box for a motor vehicle includes a cover member that may be provided on a connector-mounting section on which an important connector, for example an air bag connector, may be mounted. The cover member may serve to prevent the connector from coming out of the electrical junction box, thereby enhancing safety in the connection of the connector. Such a cover member has been disclosed in, for example, JP 2000-323232 A.

In the above electrical junction box, when the cover member is not used (e.g., during a standby state), the cover member may be held in a first rotary end position apart from the connector-mounting section utilizing a biasing force of a spring member interposed between the cover member and the connector-mounting section. This structure can prevent the cover member from engaging with the connector-mounting section by mistake, and can enable the connector to be attached to and detached from the connector-mounting section. When the connector is attached to the connector-mounting section, the cover member may be displaced from the first rotary end position apart from the connector-mounting section, to a second rotary end position, against the biasing force of the spring member, to engage the cover member with the connector, thereby restraining the connector from coming out of the connector-mounting section.

In a case where the cover member may be disposed to cover another adjacent electrical component-mounting section when the cover member is held in the first rotary end position apart from the connector-mounting section, the other electrical component cannot be attached to the other electrical component-mounting section on account of interference with the cover member. This can indicate incomplete engagement between the connector-mounting section and the connector and cover member. Accordingly, it is important to stably hold the cover member in the first rotary end position apart from the connector-mounting section during the standby state of the cover member.

Utilizing a spring member to hold the cover member in the first rotary end position increases the part count and complexity of the structure in the standby state of the cover member. Accordingly, a more simplified structure is provided in JP 2004-158374 A, which proposes a holding mechanism in which an engaging projection is provided on a rotary locus of the cover member between the cover member and the connector-mounting section, and in which the cover member is prevented from moving to the connector-mounting section when the engaging projection is engaged with the cover member.

However, in this design, the cover member is incorporated with the casing through the rotary support axes, and consequently, when the cover member causes backlash and play in an axial direction of the rotary axes, an engagement condition between the engaging projection and the cover member is released and the cover member cannot be held stably in the first rotary end position.

SUMMARY

An electrical junction box according to an exemplary embodiment is provided herein configured to stably hold a cover member in a standby state in a rotary end position apart from a connector-mounting section.

In an exemplary embodiment, an electrical junction box can include a cover member rotatably attached around rotary support axes to a casing adjacent a connector-mounting section provided on the casing, such that a connector can be attached to or detached from the connector-mounting section when the cover member is disposed in a first rotary end position apart from the connector-mounting section, and the connector is prevented from coming out of the connector-mounting section when the cover member is engaged with the connector in a second rotary end position. The casing may be provided with an engaging projection that engages the cover member to position the cover member in the first rotary end position. A guide projection may be provided on one of the casing and the cover member. A pair of positioning wall portions may be provided on the other of the casing and the cover member. The cover member may be positioned with respect to the engaging projection in an axial direction of the rotary support axes when the pair of positioning wall portions pinch the guide projection.

According to an exemplary embodiment of the electrical junction box, the cover member can be held in the first rotary end position in the standby state of the cover member by engaging the cover member with the engaging projection provided on the casing. It is possible to position the cover member with respect to the engaging projection in the axial direction of the rotary support axes by inserting the guide projection provided on one of the casing and the cover member into the space between the pair of positioning wall portions provided on the other of the casing and the cover member. Thus, it is possible to restrain the backlash and play of the cover member in the axial direction of the rotary support axes in the casing, thereby positioning the cover member with respect to the engaging projection. Accordingly, it is possible to stably engage the cover member with the engaging projection during the standby state of the cover member.

According to an exemplary embodiment of the electrical junction box, because the cover member is held in the first rotary end position by engagement between the engaging projection and the cover member, it may not be necessary to provide a special member, such as a spring member, between the cover member and the casing for biasing the cover member in the direction of the first rotary end position. Furthermore, it is possible to position the cover member on the engaging projection merely by providing the engaging projection and the positioning wall portions on the cover member and the casing. Thus, it is possible to hold the cover member in the first rotary end position and to position the cover member on the engaging projection, without requiring a high part count. Accordingly, the engaging projection may be integrated with the casing, and the guide projection and positioning wall portions may be integrated with one and the other of the casing and the cover member.

In an exemplary embodiment, the electrical junction box may be a structure in which the guide projection may be inserted into the space between the pair of positioning wall portions through the whole area from the first rotary end position of the cover member to the second rotary end position of the cover member. Thus, it may be possible to prevent the backlash and play of the cover member in the axial direction of the rotary support axes through the whole rotary area, thereby effecting a stable rotary operation.

According to another exemplary embodiment, the guide projection may be pressed onto one of the pair of positioning wall portions.

According to another exemplary embodiment, the guide projection may contact one of the positioning wall portions without substantially any clearance between them. Thus, it is possible to precisely position the cover member in the axial direction of the rotary support axes, and it is possible to reduce the backlash and play of the cover member in the axial direction of the rotary support axes.

According to another exemplary embodiment, a lock mechanism that positions and holds the cover member in the second rotary end position may be provided on one side of the cover member in the axial direction of the rotary support axes.

According to another exemplary embodiment, the cover member may be open at the side opposite from the lock mechanism. Thus, it may not be necessary to limit a size of the connector-mounting section so as to be disposed between both sides of the lock mechanisms in the case where lock mechanisms are provided on both sides of the cover member. Consequently, it is possible to arrange the cover member along a longitudinal direction of the connector-mounting section in a good efficiency in space by partially covering the connector-mounting section, which can have a longitudinal dimension greater than that of the cover member, with the cover member. Although there may be a problem with the cover member causing backlash and play in the axial direction of the rotary support axes because the lock mechanism is not provided on the other side of the cover member in the axial direction of the rotary support axes, it may be possible to restrain the cover member from causing backlash and play by cooperating the lock mechanism with the positioning action between the engaging projection and the positioning wall portions.

According to another exemplary embodiment, the cover member may be displaced away from the lock mechanism in the axial direction of the rotary support axes when the guide projection is pressed onto one of the pair of positioning wall portions.

According to another exemplary embodiment, the cover member may be displaced away from the lock mechanism in the axial direction of the rotary support axes by the contact pressure exerted onto the guide projection provided on the cover member or the positioning wall portions from the guide projection provided on the casing or the positioning wall portions. Thus, it may be possible to reduce backlash and play of the cover member in the lock mechanism, thereby effecting in some aspects a more stable locking action and also more stably holding the cover member in the second rotary end position.

According to another exemplary embodiment, end edges of the pair of positioning wall portions at a side of the guide projection may be tapered so that an opposed distance between the pair of positioning wall portions gradually increases as the end edges extend toward the guide projection. Accordingly, it may be possible to readily insert the guide projection into the space between the pair of the positioning wall portions.

According to exemplary embodiments, the engaging projection may be provided on the casing so that the engaging projection can engage the cover member to position the cover member in the first rotary end position apart from the connector-mounting section, the guide projection may be provided on one of the cover member and the casing, the pair of positioning wall portions may be provided on the other of the cover member and the casing, and the pair of positioning wall portions can pinch the guide projection. Thus, the cover member may be positioned with respect to the engaging projection in the axial direction of the rotary support axes. Accordingly, it is possible to more positively and stably engage the cover member with the engaging projection, thereby more positively and stably holding the cover member in the first rotary end position with a low part count.

DETAILED DESCRIPTION OF EMBODIMENTS

Referring now to the drawings, exemplary embodiments of an electrical junction box are described below.

Figure 1A:
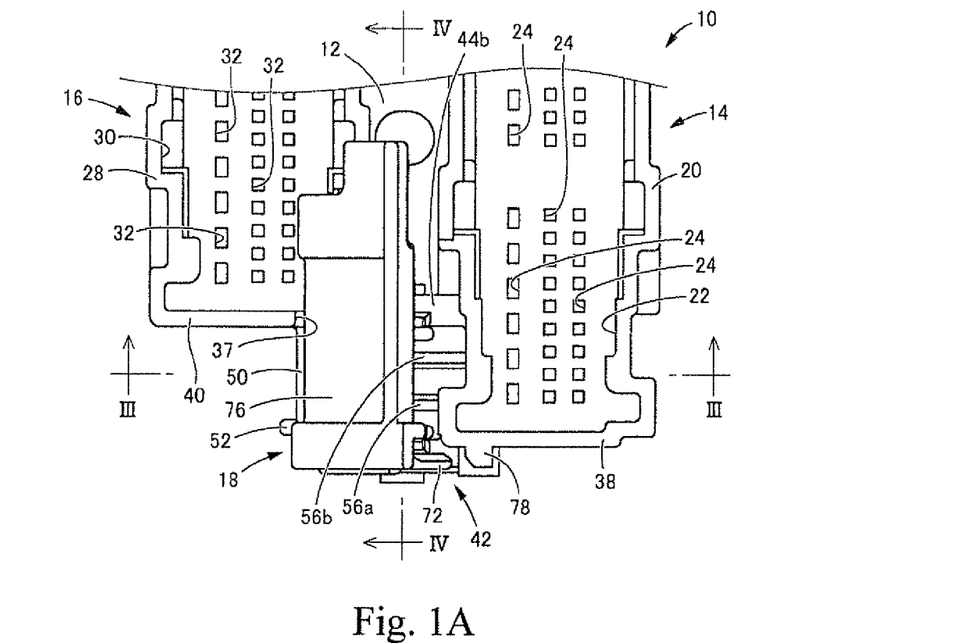
FIGS. 1A and 1B are plan views of a main part of an electrical junction box in accordance with an exemplary embodiment of the present invention.

FIGS. 1A-4 show a main part of an electrical junction box 10. A first connector-mounting section 14 and a second connector-mounting section 16 may be provided in a casing 12 of the electrical junction box 10 so that the sections 14 and 16 are disposed adjacent and spaced apart from each other. A cover member 18 may be rotatably coupled to the casing 12 between the first and second connector-mounting sections 14 and 16. FIGS. 1A and 2A show an open position of the cover member 18, while FIGS. 1B and 2B show a closed position of the cover member 18. Hereinafter, upper and lower directions mean upper and lower directions in FIGS. 2A and 2B except where specifically noted.

The first connector-mounting section 14 can include a hood portion 20 that may be formed into a substantially rectangular peripheral wall-like configuration in a longitudinal direction, so as to project upward from the casing 12. A space surrounded by the hood portion 20 may define a connector-containing area 22. Connecting terminals (not shown) may be contained in the connector-containing area 22 in the electrical junction box 10 so as to be connected to an air bag circuit. The connecting terminals may project through terminal-receiving holes 24 in the casing 12 in the connector-containing area 22. As shown by the imaginary lines in FIG. 1B, a connector 26 may be fitted in the hood portion 20, may be housed in the connector-containing area 22, and may be connected to the connecting terminals that project in the connector-containing area 22. The air bag connector 26, for example, may be provided on an end of a wire harness that constitutes the air bag circuit.

The second connector-mounting section 16 can include a hood portion 28 that may be formed into a substantially rectangular peripheral wall-like configuration in a longitudinal direction so as to project upward from the casing 12. A space surrounded by the hood portion 28 may define a connector-containing area 30. Connecting terminals (not shown) may be contained in the connector-containing area 30 in the electrical junction box 10 so as to be connected to another electrical circuit different from the air bag circuit. The connecting terminals may project through terminal-receiving holes 32 in the casing 12 in the connector-containing area 30. As shown by the imaginary lines in FIG. 1B, a connector 36 may be fitted in the hood portion 28, may be housed in the connector-containing area 30, and may be connected to connecting terminals that project in the connector-containing area 30. The connector 36 may be provided on an end of a wire harness that constitutes another electrical circuit different from the air bag circuit. The hood portion 28 may be provided with a recess 37 on a corner at a side on which the cover member 18 may be disposed. The height of the recess 37 may be small.

The first and second connector-mounting sections 14 and 16 may be spaced apart from each other and may be juxtaposed in a direction perpendicular to a longitudinal direction. A longitudinal end 38 of the first connector-mounting section 14 may extend over a longitudinal end 40 of the second connector-mounting section 16 in the longitudinal directions of the first and second connector-mounting sections 14 and 16.

Figure 5:
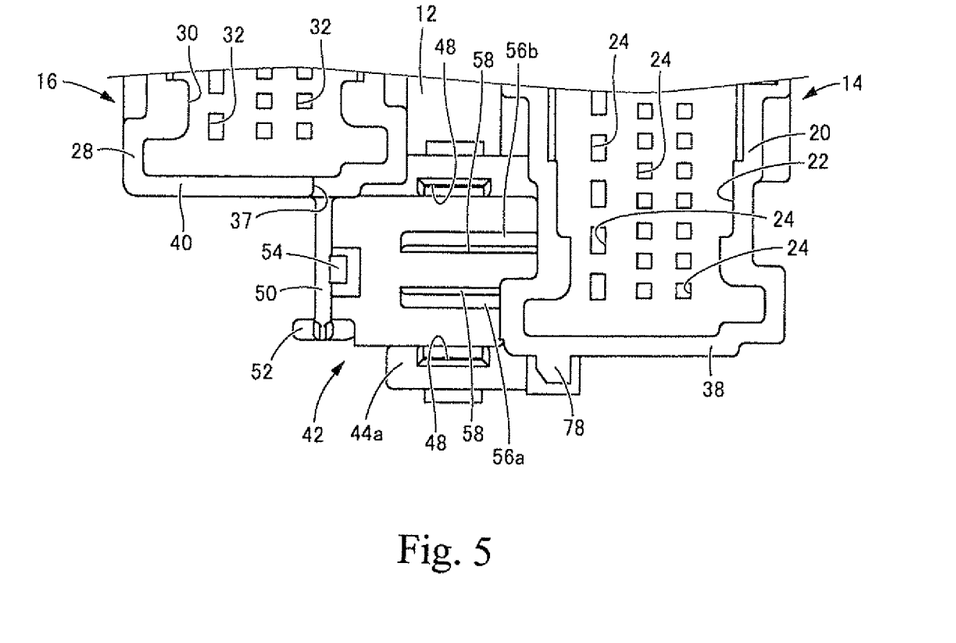
FIG. 5 is a plan view of a main part of a casing shown in FIGS. 1A and 1B.

A cover-attaching section 42 may be provided between the first and second connector-mounting sections 14 and 16. As shown in FIG. 5, a pair of bearing portions 44a and 44b may be provided on the cover-attaching section 42 and may be integrated with the casing 12. The bearing portions 44a and 44b may be formed into substantially plate-like configurations to project upward from the casing 12. The one bearing portion 44a may be positioned on the end 38 of the first connector-mounting section 14 in the longitudinal directions of the first and second connector-mounting sections 14 and 16, so as to be coupled to the hood portion 20 of the first connector-mounting section 14. The other bearing portion 44b may be positioned on the end 40 of the second connector-mounting section 16, so as to bridge the end 40 and the hood portion 20 of the first connector-mounting section 14. Thus, the bearing portions 44a and 44b may be spaced apart from each other by a given distance in the longitudinal direction of the first connector-mounting section 14.

Figure 4:
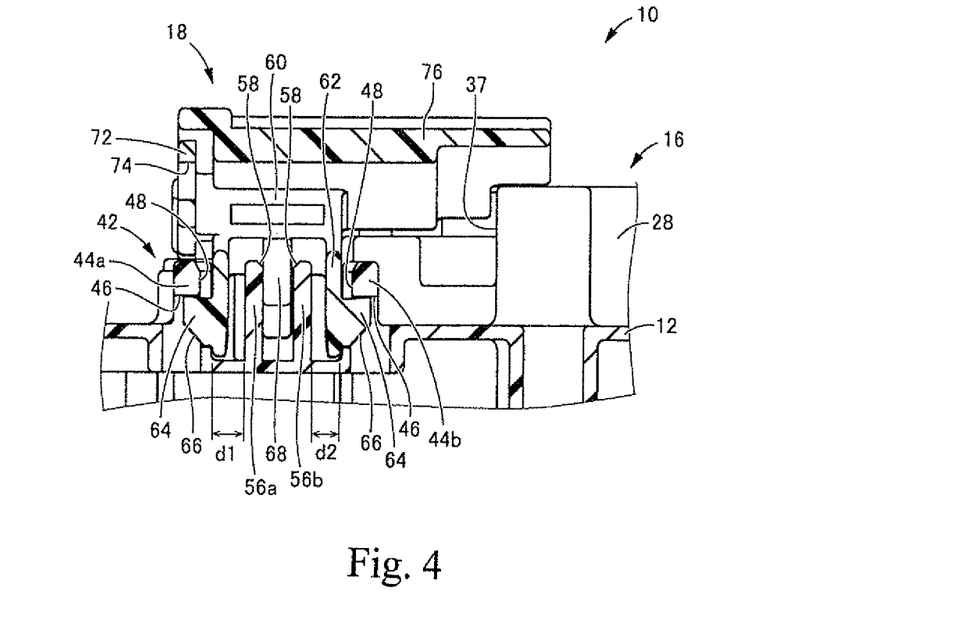
FIG. 4 is a section view of the electrical junction box taken along lines IV-IV in FIG. 1A.

Each of the bearing portions 44a and 44b may be provided with a bearing hole having a substantially circular shape in cross section and extending in the width direction of each bearing portion (i.e., right and left directions in FIG. 4). Guide grooves 48 may be open in the opposed surfaces of the bearing portions 44a and 44b and extend upward from the bearing holes 46. Each of the guide grooves 48 may be open in a projecting end surface from the casing 12 on each of the bearing portions 44a and 44b.

As shown in FIG. 5, the cover-attaching section 42 may be provided with an engaging wall portion 50. The engaging wall portion 50 may be formed into a substantially rectangular plate-like configuration that may project upward from the casing 12. The engaging wall portion 50 may be integrated with the casing 12 and may extend outward from the end 40 of the second connector-mounting section 16 in the longitudinal direction of the section 16, so that the engaging wall portion 50 may be opposed to the hood portion 20 of the first connector-mounting section 14. The engaging wall portion 50 may be provided on a distal end projecting from the second connector-mounting section 16 with a triangular reinforcement plate portion 52 that may extend perpendicular to the engaging wall portion 50. The engaging wall portion 50 may be provided with an engaging protrusion 54 on a distal end projecting from the casing 12 that may project toward the cover member 18. The engaging protrusion 54 may be provided on a substantially central part of the engaging wall portion 50 in its width direction (i.e., upper and lower directions in FIG. 5) so as to be disposed on a rotary locus of an engaging portion 70 of the cover member 18. The engaging projection 54 may be formed into a configuration combined with a substantially semi-circular shape in a lower half part and a substantially triangular shape in an upper half part in a side elevation view (e.g., see FIG. 3). However, the engaging projection 54 is not limited to the above embodiment. The engaging projection 54 may be formed into a semi-circular shape, a triangular shape, a rectangular shape or the like, for example.

The cover-attaching section 42 may be provided with a pair of positioning wall portions 56a and 56b. The positioning wall portions 56a and 56b may project upward from the casing 12, may be formed into a substantially rectangular plate-like configuration that extends from the hood portion 20 of the first connector-mounting section 14 to the engaging wall portion 50, and may be integrated with the casing 12. The positioning wall portions 56a and 56b may be disposed between the bearing portions 44a and 44b, may be spaced apart from each other by a given distance in a direction facing the bearing portions 44a and 44b and opposed to each other, and may extend parallel to each other in a direction perpendicular to the direction facing the bearing portions 44a and 44b. One end of each of the positioning wall portions 56a and 56b may be coupled to the hood portion 20 to enhance the strength of the portions 56a and 56b. However, the positioning portions 56a and 56b may not be coupled to the hood portion 20, but may be independent of the hood portion 20. The other of the positioning wall portions 56a and 56b may be provided on opposed surfaces on upper ends at a side of a guide projection 68 of the cover member 18 with tapered surfaces 58 and 58 that gradually increase in spacing in an upper direction.

The positioning wall portion 56a may be provided near the bearing portion 44a, while the positioning wall portion 56b may be provided near the bearing portion 44b. As shown in FIG. 4, a distance d1 between the positioning wall portion 56a and the bearing portion 44a may be slightly different from a distance d2 between the positioning wall portion 56b and the bearing portion 44b. Distance d1 may be larger than distance d2.

The cover member 18 may be coupled to the cover-attaching section 42. The cover member 18 may be an integrated product made of a synthetic resin. The cover member 18 may be provided with a pair of support plate portions 62, 62 that project from opposite ends in a width direction (i.e., right and left directions in FIG. 4) of a rectangular frame-like component main body 60. The support plate portions 62, 62 may be provided on projecting ends from the component main body 60 with substantially cylindrical rotary support axes 64, 64 that may project outward at opposite sides in the width direction (i.e., right and left directions in FIG. 4) of the cover member 18. Each rotary support axis 64 may include a slanted surface 66 on its outer peripheral surface that becomes gradually smaller in a projecting direction (i.e., a lower direction in FIG. 4) from the component main body 60 on the support plate portion 62. The slanted surface 66 may serve to facilitate insertion of each of the bearing portions 44a and 44b.

Figure 3:
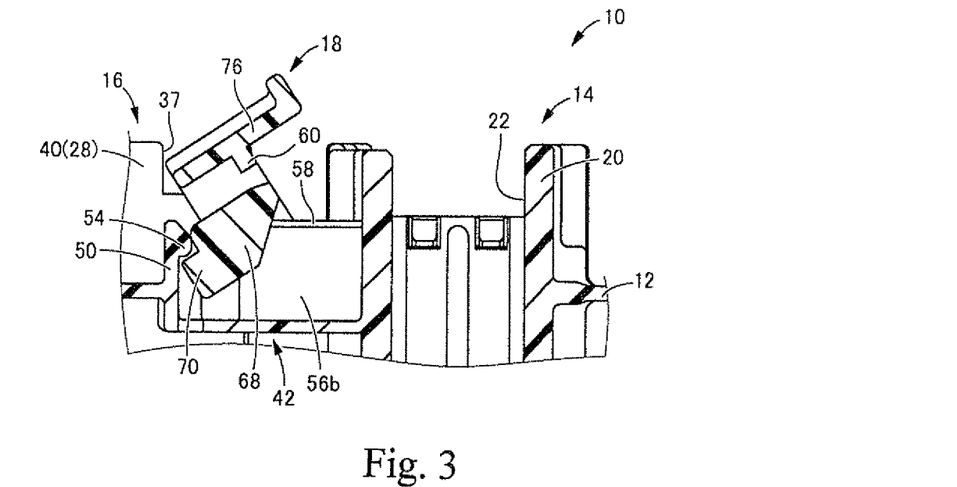
FIG. 3 is a section view of the electrical junction box taken along lines III-III in FIG. 1A.

The component main body 60 may include a guide projection 68 on its central part in the width direction that projects in the same direction as the support plate portions 62, 62. The guide projection 68 may be spaced apart from the support plate portions 62, 62 by about an equal distance in the width direction (i.e., right and left directions in FIG. 4) of the component main body 60 so as to be disposed on about a central position between the support plate portions 62 and 62. The width of the guide projection 68 may be smaller than a distance between the positioning wall portions 56a and 56b. As shown in FIG. 3, the guide projection 68 may also project in a direction perpendicular to the projecting direction from the component main body 60 of the support plate portions 62, 62. The projecting portion may define an engaging portion 70. The engaging portion 70 may be formed into a projection piece that may protrude from a central part of the component main body 60 in the width direction.

Figure 2A:
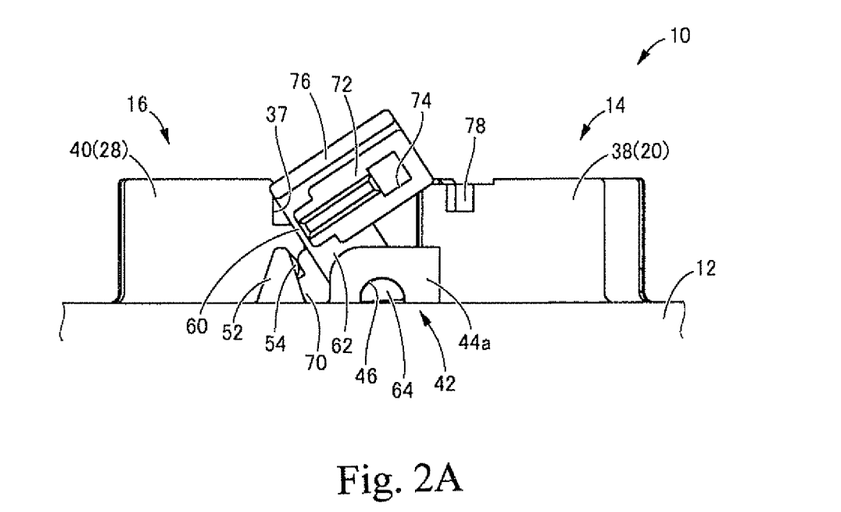
FIGS. 2A and 2B are side elevation views of a main part of the electrical junction box shown in FIGS. 1A and 1B, respectively.
Figure 2B:
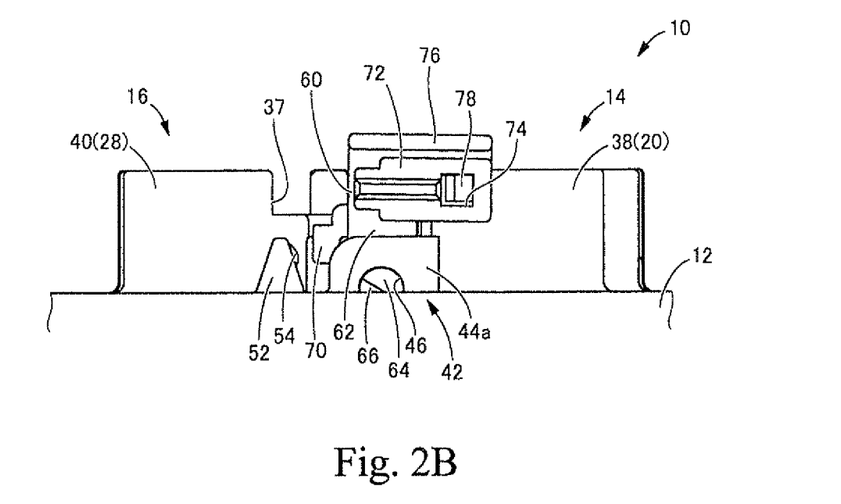

The component main body 60 may include a lock piece 72 on its one side in the width direction. As shown in FIG. 2, the lock piece 72 may be formed into a substantially plate-like configuration that may project from the component main body 60 at a side opposite from the engaging portion 70. The lock piece 72 may include a substantially rectangular lock hole 74 on its distal end projecting from the component main body 60.

The component main body 60 may include a top board 76 on its upper end. The top board 76 may have a substantially longitudinal plate-like configuration and may project from the component main body 60 in substantially the same direction as the lock piece 72. In addition, as shown in FIG. 4, the top board 76 may extend greatly to a side opposite from the lock piece 72 in the width direction (i.e., right and left directions in FIG. 4) of the component main body 60.

When the engaging portion 70 is disposed on the cover member 18 on a side of the engaging projection 54, the rotary support axes 64, 64 may be superimposed on openings in the guide grooves 48, 48 of the bearing portions 44a, 44b. When the cover member 18 is pushed into the casing 12, the support plate portions 62, 62 may be deflected in a direction approaching each other, and the rotary support axes 64, 64 may be inserted into the guide grooves 48, 48. Then, when the cover member 18 is pushed farther into the casing 12, the rotary support axes 64, 64 may be inserted into the bearing holes 46, 46 in the bearing portions 44a, 44b, and the support plate portions 62, 62 may return from the deflected positions to the original positions. Thus, the cover member 18 may be attached to the casing 12 rotatably around the rotary support axes 64, 64, and the cover member 18 may be set so that the cover member 18 can move toward and away from the first connector-mounting section 14.

When the rotary support axes 64, 64 of the cover member 18 are coupled to the bearing portions 44a, 44b, the guide projection 68 of the cover member 18 may be inserted into a space between the pair of positioning wall portions 56a and 56b of the casing 12. Because the positioning wall portions 56a and 56b may be provided with the tapered surfaces 58 and 58, the guide projection 68 can be smoothly inserted into the space between the portions 56a and 56b.

In a case where the air bag connector 26 and the connector 36 are connected to the electrical junction box 10, the cover member 18 may first be turned to the side of the second connector-mounting section 16 to position the cover member 18 at the first rotary end position apart from the first connector-mounting section 14, as shown in FIG. 1A. As shown in FIG. 3, because the engaging portion 70 is engaged with the engaging projection 54, the cover member 18 may be positioned and held at the first rotary end position.

As shown in FIG. 1A, the top board 76 of the cover member 18 may be disposed at a position outside the connector-containing area 22 of the first connector-mounting section 14. Thus, the air bag connector 26 can be easily attached to and detached from the first connector-mounting section 14. At the same time, when the cover member 18 is disposed at the first rotary end position, the top board 76 may be disposed above the connector-containing area 30 on the second connector-mounting section 16 so that the top board 76 may be inserted into the recess 37 in the hood portion 28 on the second connector-mounting section 16. Thus, when the cover member 18 is disposed at the first rotary end position, the cover member 18 can interfere with the attachment and detachment of the connector 36 to and from the second connector-mounting section 16.

When the cover member 18 is positioned at the first rotary end position, and after the air bag connector 26 is attached to the first connector-mounting section 14, the cover member 18 may be turned to the first connector-mounting section 14. Then, the engaging portion 70 of the cover member 18, may be positioned over the engaging projection 54. As shown in FIG. 2B, the lock piece 72 of the cover member 18 may be positioned over the lock pawl 78 projecting from the end 38 of the first connector-mounting section 14, the lock pawl 78 may be engaged with the lock hole 74, the cover member 18 may be engaged with the first connector-mounting section 14, and the cover member 18 may be positioned and held in the second rotary end position. Thus, the lock piece 72 and lock pawl 78 may constitute a lock mechanism.

Figure 1B:
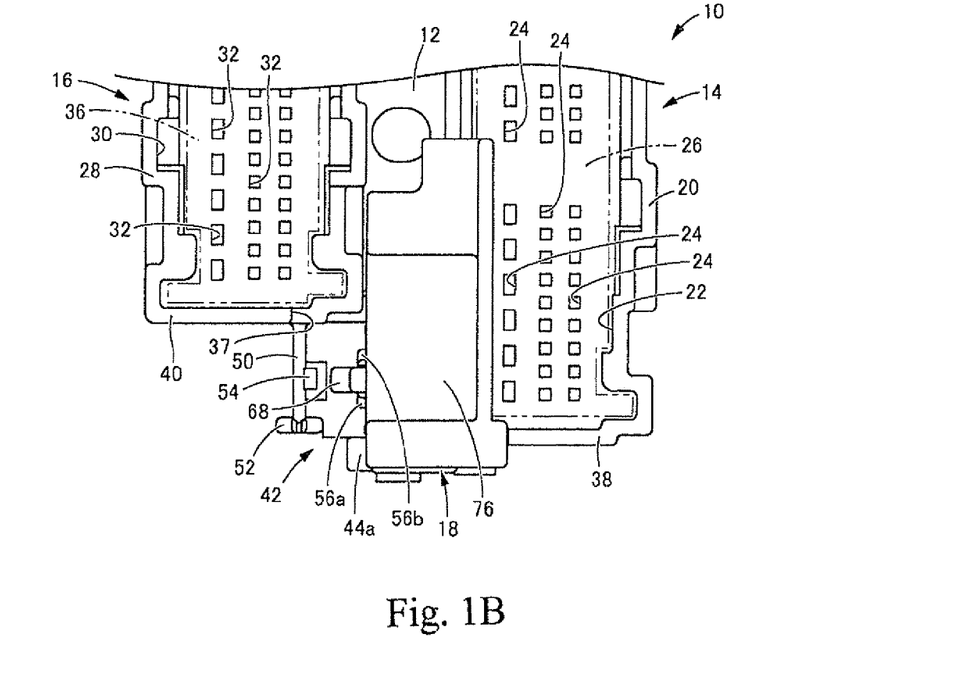

As shown in FIG. 1B, when the cover member 18 is disposed in the second rotary end position, the top board 76 of the cover member 18 may be disposed above the connector-containing area 22 on the first connector-mounting section 14. Thus, the top board 76 may cover the air bag connector 26. Even in the event the air bag connector 26 is likely to come out of the first connector-mounting section 14 on account of vibrations or the like in a motor vehicle, the top board 76 may contact the air bag connector 26 to prevent the air bag connector 26 from coming out of the first connector-mounting section 14. In addition, when the cover member 18 is disposed in the second rotary end position, the top board 76 may be disposed outside of the connector-containing area 30 on the second connector-mounting section 16. Thus, the connector 36 may be mounted on the second connector-mounting section 16 so that the connector 36 can be attached and detached to and from the second connector-mounting section 16.

The engaging portion 70 integrated with the cover member 18 may be engaged with the engaging projection 54 integrated with the casing 12, thereby holding the cover member 18 in the first rotary end position without increasing the part count.

It is possible to position the cover member 18 with respect to the engaging projection 54 in the axial direction (i.e., right and left directions in FIG. 4) of the rotary support axes 64, 64 by inserting the guide projection 68 on the cover member 18 into the space between the positioning wall portions 56a and 56b, and pinching the guide projection 68 by the portions 56a and 56b. Thus, it is possible to restrain any backlash and play of the cover member 18 in the axial direction of the rotary support axes 64, 64, and to more positively engage the engaging portion 70 with the engaging projection 54, thereby maintaining an engaging condition of the engaging portion 70 with the engaging projection 54. Consequently, it is possible to more stably maintain the cover member 18 in the first rotary end position.

In particular, since the guide projection 68 and the positioning wall portions 56a and 56b may be integrated with the cover member 18 and the casing 12, respectively, it is possible to stably hold the cover member 18 in the first rotary end position without increasing the part count. Furthermore, the guide projection 68 may be inserted into and held in the space between the positioning wall portions 56a and 56b through the whole area from the first rotary end position of the cover member 18 to the second rotary end position. Thus, it is possible to prevent the cover member 18 from causing backlash and play in the axial direction of the rotary support axes 64, 64 during the whole rotary action of the cover member 18, thereby effecting a stable rotary action.

In addition, as shown in FIG. 4, the distance d1 between the bearing portion 44a and the positioning wall portion 56a may be set to be slightly greater than the distance d2 between the bearing portion 44b and the positioning wall portion 56b. Thus, when the cover member 18 is attached to the casing 12, the guide projection 68 may be slightly deviated to the side of the positioning wall portion 56a between the positioning wall portions 56a and 56b so that the guide projection 68 can press the positioning wall portion 56a. Consequently, it may be possible to reduce the backlash and play of the guide projection 68 against the positioning wall portion 56a, thereby more precisely positioning the cover member 18 in the axial direction of the rotary support axes 64, 64.

The cover member 18 may be provided with the lock piece 72 on one side in the axial direction (i.e., right and left directions in FIG. 4) of the rotary support axes 64, 64. Thus, it is possible to form the top board 76 into an elongate configuration that can extend in a direction opposite from the lock piece 72. At the same time, because the cover member 18 may be open in the direction opposite from the lock piece 72, it may be possible to partially superimpose the top board 76 on the hood portion 20 along its longitudinal direction on the first connector-mounting section 14, thereby efficiently arranging the cover member 18 between the first and second connector-mounting sections 14 and 16.

Since the lock mechanisms (72, 78) are provided on the end of the cover member 18 in the axial direction of the rotary support axes 64, 64, the cover member 18 may cause backlash and play in the axial direction of the rotary support axes 64, 64, the lock piece 72 may be displaced from the hood portion 20 on which the lock pawl 78 is provided (i.e., displaced from the right side to the left side in FIG. 4), and there may be backlash and play between the lock piece 72 and the lock pawl 78. However, according to the exemplary embodiment, because the guide projection 68 can be inserted into the space between the positioning wall portions 56a and 56b, it may be possible to restrain displacement of the cover member 18 in the axial direction of the rotary support axes 64, 64, and coordinate positioning action between the guide projection 68 and the positioning wall portions 56a, 56b, and engaging action between the lock piece 72 and the lock pawl 78 can restrain backlash and play of the cover member 18, even if the lock mechanism (72, 78) is provided on one side of the cover member 18. Particularly, in the exemplary embodiment, the positioning wall portions 56a and 56b may be deviated slightly to a side opposite from the lock mechanism (72, 78) in the axial direction of the rotary support axes 62, 62 with respect to the guide projection 68 of the cover member 18. Thus, the guide projection 68 can be pressed onto the positioning wall portion 56a disposed near the lock mechanism (72, 78) in the axial direction of the rotary support axes 62, 62, and the cover member 18 may be slightly displaced in the axial direction of the rotary support axes 62, 62 and in the direction apart from the lock mechanism (72, 78) by a contact pressure from the positioning wall portions 56a. Thus, it is possible to press the lock piece 72 onto the hood portion 20 of the first connector-mounting section 14, thereby stably maintaining the engagement between the lock piece 72 and the lock pawl 78.

Although exemplary embodiments of an electrical junction box have been described above in detail, it should be noted that the present invention is not limited to the above embodiment. For example, the guide projection may be provided on the casing and the pair of positioning wall portions may be provided on the cover member.

Further, the cover member may not be engaged with and locked on the casing. For example, the lock pawl may be provided on the connector and the cover member may be engaged with and locked on the lock pawl on the connector attached on the connector-mounting section.

What is claimed is:

1. An electrical junction box having a cover member that is rotatably attached around rotary support axes to a casing adjacent a connector-mounting section provided on the casing such that a connector can be attached to or detached from the connector-mounting section when the cover member is disposed in a first position apart from the connector-mounting section, and the connector is prevented from being removed from the connector-mounting section when the cover member is in a second position engaged with the connector, the electrical junction box comprising:
   an engaging projection provided on the casing that engages the cover member to hold the cover member in the first position;
   a guide projection provided on one of the casing and the cover member; and
   a pair of positioning wall portions provided on the other of the casing and the cover member;
   wherein the cover member is positioned with respect to the engaging projection in an axial direction of the rotary support axes when the pair of positioning wall portions pinch the guide projection.

2. An electrical junction box according to claim 1, wherein the guide projection is pressed onto one of the pair of positioning wall portions.

3. An electrical junction box according to claim 2, wherein a lock mechanism that positions and holds the cover member in the second position is provided on one side of the cover member in the axial direction of the rotary support axes.

4. An electrical junction box according to claim 3, wherein the cover member is displaced away from the lock mechanism in the axial direction of the rotary support axes when the guide projection is pressed onto one of the pair of positioning wall portions.

5. An electrical junction box according to claim 4, wherein end edges of the pair of positioning wall portions at a side of the guide projection are tapered so that a distance between the pair of positioning wall portions becomes gradually greater as the end edges extend toward the guide projection.

6. An electrical junction box according to claim 1, wherein a lock mechanism that positions and holds the cover member in the second position is provided on one side of the cover member in the axial direction of the rotary support axes.

7. An electrical junction box according to claim 1, wherein end edges of the pair of positioning wall portions at a side of the guide projections are tapered so that a distance between the pair of positioning wall portions becomes gradually greater as the end edges extend toward the guide projection.

8. An electrical junction box according to claim 1, wherein when the cover member is disposed in the first position, the pair of positioning wall portions pinch the guide projection so that the cover member is held in a position that is fixed in the axial direction of the rotary support axes.

9. An electrical junction box having a cover member that is rotatably attached around rotary support axes to a casing adjacent a connector-mounting section provided on the casing such that a connector can be attached to or detached from the connector-mounting section when the cover member is disposed in a first position apart from the connector-mounting section, and the connector is prevented from being removed from the connector-mounting section when the cover member is in a second position engaged with the connector, the electrical junction box comprising:

an engaging projection provided on the casing that engages the cover member to position the cover member in the first position;

a guide projection provided on one of the casing and the cover member; and a pair of positioning wall portions provided on the other of the casing and the cover member; wherein:

the cover member is positioned with respect to the engaging projection in an axial direction of the rotary support axes when the pair of positioning wall portions pinch the guide projection;

the guide projection is pressed onto one of the pair of positioning wall portions;

a lock mechanism that positions and holds the cover member in the second position is provided on one side of the cover member in the axial direction of the rotary support axes; and the cover member is displaced away from the lock mechanism in the axial direction of the rotary support axes when the guide projection is pressed onto one of the pair of positioning wall portions.

10. An electrical junction box according to claim 9, wherein end edges of the pair of positioning wall portions at a side of the guide projection are tapered so that a distance between the pair of positioning wall portions becomes gradually greater as the end edges extend toward the guide projection.

11. An electrical junction box having a cover member that is rotatably attached around rotary support axes to a casing adjacent a connector-mounting section provided on the casing such that a connector can be attached to or detached from the connector-mounting section when the cover member is disposed in a first position apart from the connector-mounting section, and the connector is prevented from being removed from the connector-mounting section when the cover member is in a second position engaged with the connector, the electrical junction box comprising:

an engaging projection provided on the casing that engages the cover member to position the cover member in the first position;

a guide projection provided on one of the casing and the cover member; and a pair of positioning wall portions provided on the other of the casing and the cover member, wherein end edges of the pair of positioning wall portions at a side of the guide projections are tapered so that a distance between the pair of positioning wall portions becomes gradually greater as the end edges extend toward the guide projection; and wherein the cover member is positioned with respect to the engaging projection in an axial direction of the rotary support axes when the pair of positioning wall portions pinch the guide projection.

* * * * *